(12) United States Patent
Ahmadi (10) Patent No.: US 8,873,480 B2
(45) Date of Patent: Oct. 28, 2014

(54) TECHNIQUES FOR DYNAMIC SPECTRUM MANAGEMENT, ALLOCATION, AND SHARING

(75) Inventor: Sassan Ahmadi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 683 days.

(21) Appl. No.: 13/029,439

(22) Filed: Feb. 17, 2011

(65) Prior Publication Data

US 2012/0082100 A1  Apr. 5, 2012

Related U.S. Application Data

(60) Provisional application No. 61/389,080, filed on Oct. 1, 2010.

(51) Int. Cl.
| | |
|---|---|
| *H04J 3/00* | (2006.01) |
| *H04W 72/12* | (2009.01) |
| *H04W 76/04* | (2009.01) |
| *H04W 88/06* | (2009.01) |
| *H04W 8/24* | (2009.01) |

(52) U.S. Cl.
CPC ........ *H04W 72/1215* (2013.01); *H04W 76/048* (2013.01); *H04W 88/06* (2013.01); *H04W 8/245* (2013.01)
USPC .......................... 370/329; 370/341; 455/452.1

(58) Field of Classification Search
CPC ... H04W 72/04; H04W 72/044; H04W 16/14; H04L 5/0007
See application file for complete search history.

(56) References Cited

U.S. PATENT DOCUMENTS

| | | | |
|---|---|---|---|
| 8,503,480 B2 * | 8/2013 | Yonge et al. .................. | 370/468 |
| 2006/0083205 A1 | 4/2006 | Buddhikot et al. | |
| 2006/0160543 A1 * | 7/2006 | Mashinsky ................. | 455/452.2 |
| 2008/0108365 A1 | 5/2008 | Buddhikot et al. | |
| 2008/0242301 A1 * | 10/2008 | Osterling et al. ............. | 455/436 |
| 2008/0287068 A1 * | 11/2008 | Etemad ........................... | 455/68 |
| 2009/0059785 A1 * | 3/2009 | Jogalekar et al. ............. | 370/230 |
| 2009/0219868 A1 * | 9/2009 | Lee et al. ...................... | 370/329 |
| 2010/0248764 A1 * | 9/2010 | Callaway et al. ............. | 455/509 |
| 2011/0205941 A1 * | 8/2011 | Stanforth ...................... | 370/280 |
| 2011/0280194 A1 * | 11/2011 | Schmidt et al. ............... | 370/329 |
| 2011/0287794 A1 * | 11/2011 | Koskela et al. ............... | 455/509 |

FOREIGN PATENT DOCUMENTS

| | | |
|---|---|---|
| WO | 2012/045055 A2 | 4/2012 |
| WO | 2012/045055 A3 | 7/2012 |

OTHER PUBLICATIONS

International Preliminary Report on Patentability Received in PCT Application Serial No. PCT/US2011/054463, mailed Apr. 11, 2013, 6 pages.

International Search Report & Written Opinion Received in PCT Application Serial No. PCT/US2011/054463, mailed Mar. 28, 2012, 7 pages.

* cited by examiner

*Primary Examiner* — Kibrom T Hailu
(74) *Attorney, Agent, or Firm* — Thorpe North & Western LLP (57) ABSTRACT

Techniques for managing detection, dynamic allocation, and sharing of available spectrum via cognitive radio systems and dynamic spectrum sharing. In some cases, RF carriers (e.g., secondary carriers or secondary cells) are not permanently assigned to base stations, user terminals, or the network. A base station can request allocation of secondary carriers using a reservation request. The assigned secondary carriers can be released and made available for assignment to another base station or radio access network.

16 Claims, 5 Drawing Sheets

TECHNIQUES FOR DYNAMIC SPECTRUM MANAGEMENT, ALLOCATION, AND SHARING

RELATED ART

This application is related to U.S. Patent Application Ser. No. 61/389,080, filed Oct. 1, 2010 and claims priority there from.

FIELD

The subject matter disclosed herein relates generally to techniques for dynamic sharing and allocation of spectrum in a wireless network.

RELATED ART

In the field of wireless communications, International Telecommunications Union (ITU) has specified International Mobile Telecommunications (IMT)-Advanced systems that offer peak data transmission rates in the order of 1 Gbps for low mobility devices and 100 Mbps for high mobility devices. To achieve over-the-air data rates in that range, IEEE 802.16m and 3GPP LTE-Advanced systems use advanced multi-antenna techniques and carrier aggregation schemes, where two or more component carriers belonging to a single frequency band or different frequency bands can be aggregated to create a virtually wider bandwidth. The peak data rates as well as the system capacity are increased as a result of wider bandwidth operation. Cellular systems often use licensed spectrum which are scarce and very expensive. One of the major challenges in spectrum utilization is efficient use of radio resources associated with the assigned frequency bands through dynamic scheduling and spectrum allocation methods. It can be regarded as similar to generic medium access control allocation issue in existing communications systems. Thus, efficient use of spectrum is crucial to network operators' short-term and long-term profitability and continued business in terms of mobile customer satisfaction of the quality and quantity of provided wireless communications services.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, 3GPP standards, physical layer description of 3GPP LTE advanced 36211 release 10, and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Figure 1:
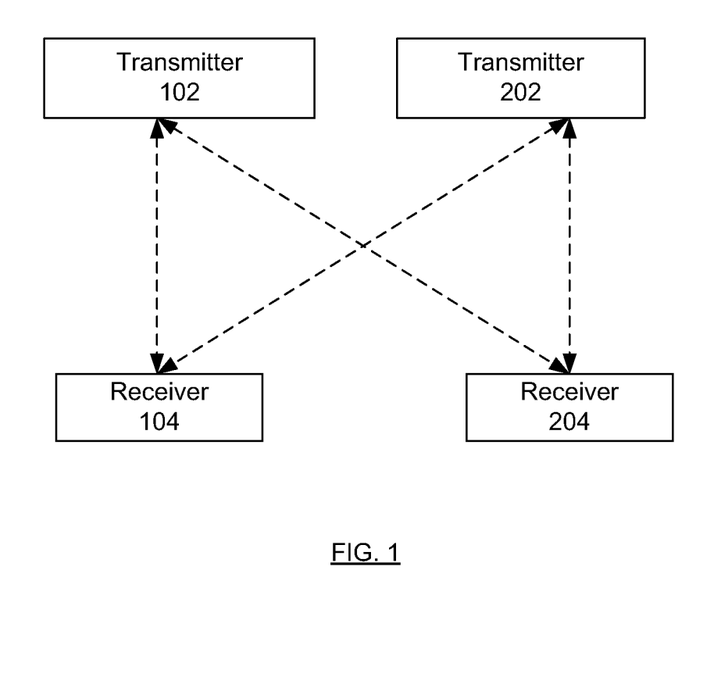
FIG. 1 depicts an example of devices connected using a wireless network.

FIG. 1 depicts an example of devices connected using a wireless network. The network can be compliant with any variety of IEEE 802.16 or 3GPP LTE as well as variations and revisions thereof. 3GPP LTE is described in 3GPP LTE Rel-9 (2009) specifications as well as variations thereof. In the downstream or downlink case, the generically-named transmitters 102 and/or 202 above may be interchangeably referred to as a base station (BS), Node B (NB), enhanced Node B (eNB), or access point (AP). In various embodiments, for the downlink, the transmitter can also be interchangeably referred to as network entities such as a Mobile Switching Center (MSC), Serving GPRS Support Node (SGSN), or Mobility Management Entity (MME). In the downlink case, receivers 104 and/or 204 above may be interchangeably referred to as a mobile station (MS), subscriber station (SS), user equipment (UE), station (STA), machine-type communication (MTC) device, or machine-to-machine (M2M) device at the system level herein. Further, the terms BS, NB, eNB, AP, MSC, SGSN, and MME may be conceptually interchanged, depending on which wireless protocol is being used, so a reference to BS herein may also be seen as a reference to any of NB, eNB, AP, MSC, SGSN, and MME. Similarly, a reference to MS or SS herein may also be seen as a reference to any of UE, STA, an MTC device, or M2M device.

Existing multi-carrier schemes designate one RF carrier as the primary RF carrier (or alternatively, a primary cell) and zero or more RF carriers as secondary RF carriers (or alternatively, secondary cells). The secondary RF carriers can be fully or partially configured and assigned to user elements (UEs) depending on the UE's capability and other operational considerations. In existing multi-carrier operation, RF carriers are permanently available at the eNB (or network operator) to be used or assigned as active carriers to different mobile stations or user terminals. By contrast, various embodiments provide for RF carriers (e.g., secondary carriers) that are not permanently available to the base stations, eNB, user terminals, or the network and are made available based on a reservation request from the network. Available spectrum can be assigned by a spectrum management entity to the base station or eNB.

Various embodiments provide for detection and management of available spectrum via cognitive radio systems. Cognitive radio systems can capture the best available spectrum to meet user communication requirements as well as channel or mobility conditions. More efficient utilization of spectrum and higher data rates and user throughputs for IMT-Advanced systems and other systems can be achieved.

Figure 2:
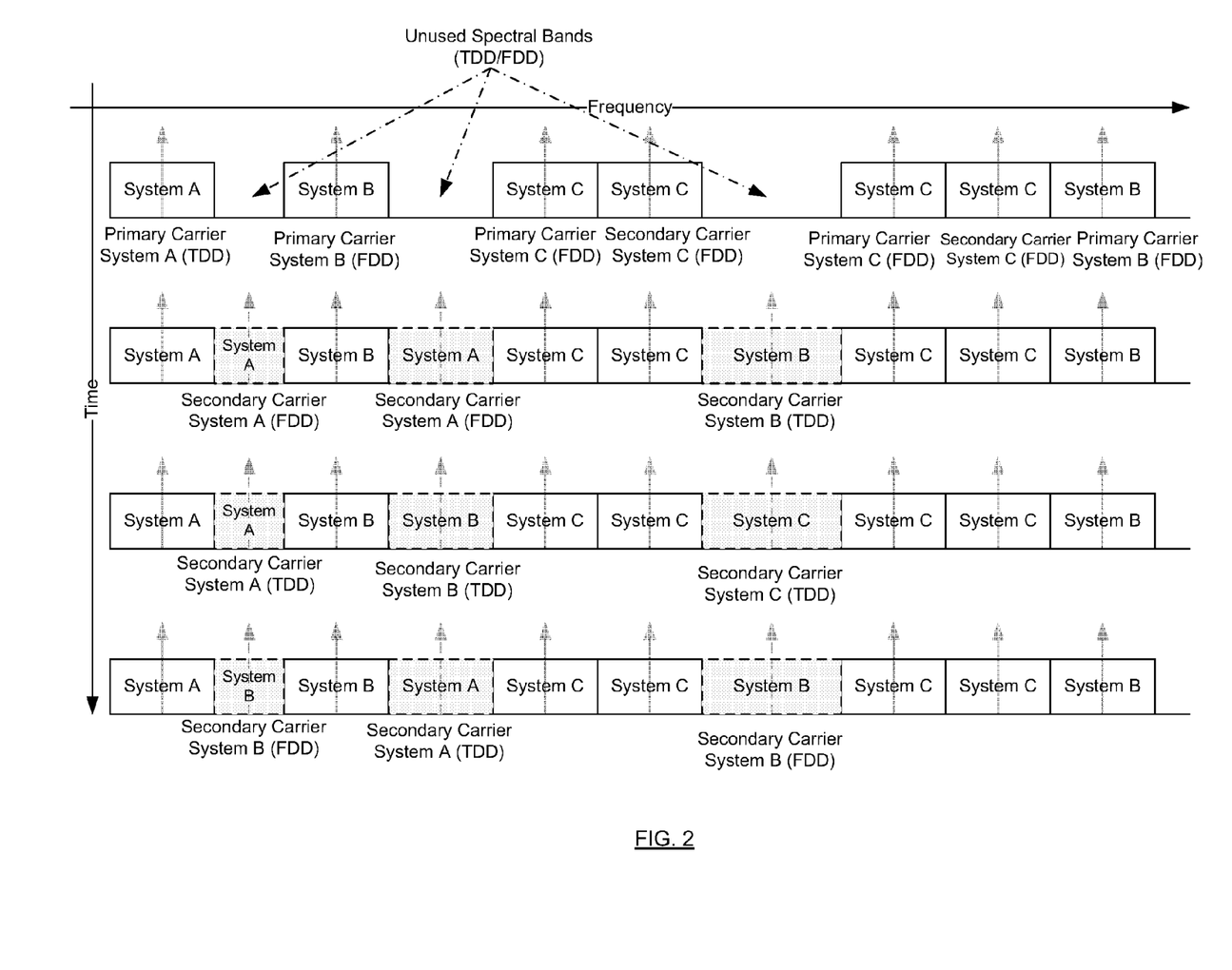
FIG. 2 shows an example of available spectral bands that are divided into permanently assigned bands and bands assigned on-demand.

FIG. 2 shows an example of available spectral bands that are divided into permanently assigned bands and bands that are assigned on-demand. Permanently assigned bands can be used to deploy the same or different radio access technology such as IEEE 802.16 or 3GPP LTE or any of the versions, revisions, and or evolved versions of the these standards. In FIG. 2, the assigned bands to different networks are referred to as System A, System B, and System C. For example, Systems A and C can be compliant with IEEE 802.16 whereas System B can be compliant with 3GPP LTE. The RF carriers associated with the center of the bands assigned to the aforementioned systems can be fully-configured primary RF carriers that are used for normal operation of the systems (i.e., base station and mobile station communications). Normal operation can include network entry/re-entry by the mobile stations, user data and control transmission in the downlink or uplink, transmission of synchronization and system configuration information, and so forth. If one permanent RF carrier is assigned to a system, then that RF carrier can be designated as the primary carrier and can be fully configured. Any additional permanent RF carrier may be assigned as a secondary RF carrier and may be fully or partially configured. Secondary RF carriers can use Time Division Duplex (TDD) or Frequency Division Duplex (FDD) duplex schemes. The temporary RF carriers can be designated as secondary RF carriers and may be fully or partially assigned. The allocation and de-allocation of primary and secondary RF carriers by eNB or base stations to the UEs or mobile stations are defined in the relevant radio access technology standards such as IEEE 802.16 and 3GPP LTE.

Figure 3:
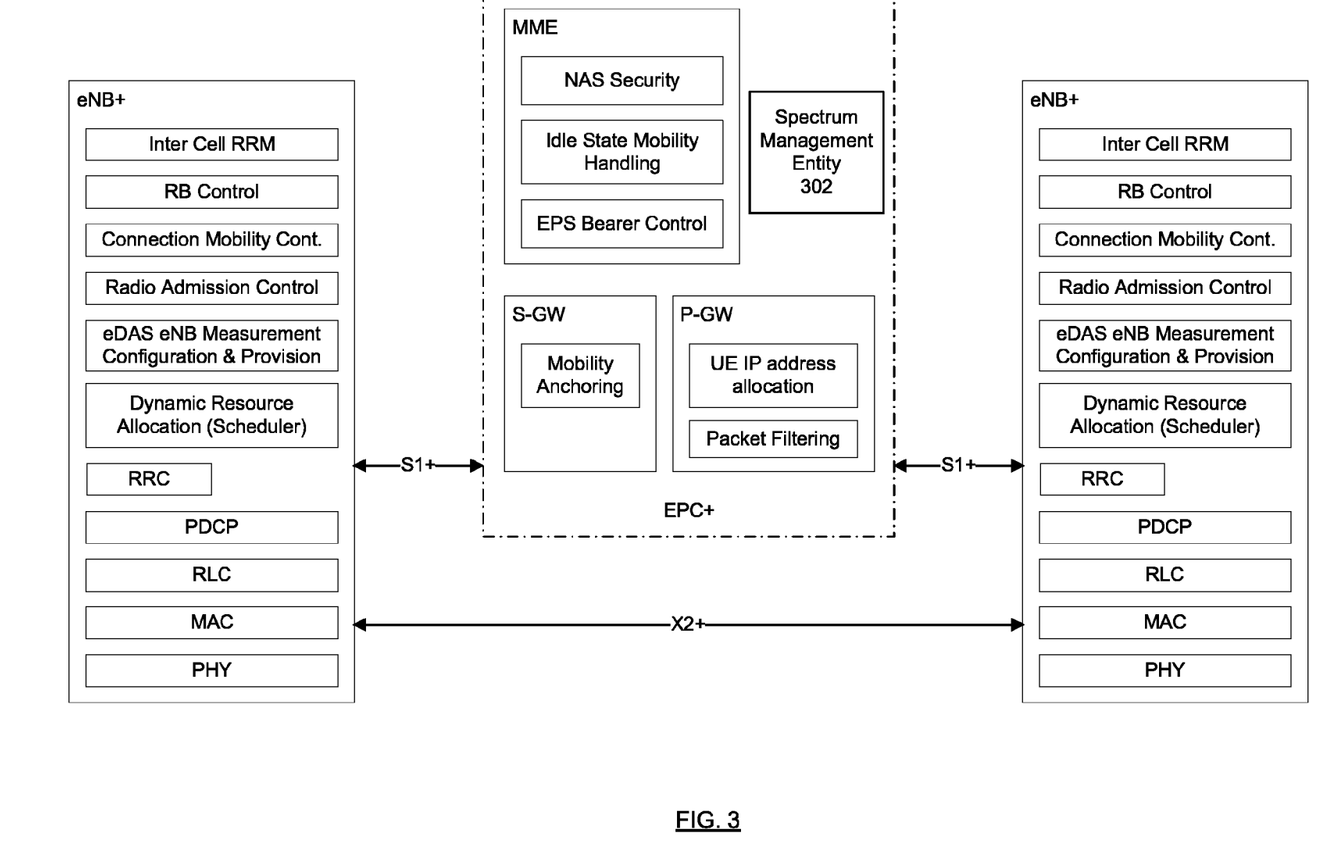
FIG. 3 depicts an example of network architecture that supports spectrum sharing.

FIG. 3 depicts an example network architecture that supports spectrum sharing. In particular, FIG. 3 depicts an example modified network architecture based on 3GPP LTE radio access and core networks. In this example, a modified version of Evolved Packet Core (EPC), shown as EPC+, includes a Spectrum Management Entity (SME) 302. The eNB+ refers to modified version of eNB supporting the proposed functionality. Each eNB+ issues a reservation request to SME 302 to request an available spectrum. Each eNB+ can allocate the spectrum assigned by SME 302 to constituent UEs (not shown). Allocation of carriers based on reservation requests uses new control signals and messages over modified versions of interfaces 51 and X2, shown as S1+ and X2+. Interfaces S1 and X2 are used in 3GPP LTE system to respectively provide communications between an EPC and eNB and communications between multiple eNBs. The modified entities and interfaces are shown as EPC+ and eNB+ and S1+ and X2+ to distinguish the modified radio access and core network elements and interfaces from their legacy counterparts. In this embodiment, 3GPP LTE standard is used as an example embodiment network. However, the proposed scheme can be used in an IEEE 802.16m radio access network and a mobile WiMAX (IEEE 802.16e) core network as well as other radio access technologies.

In various embodiments, the eNB+ and UE (not shown) both have no a priori knowledge of the secondary carrier RF bands that SME 302 may assign to the eNB+ or the UE. In various embodiments, the eNB+ and UE can both use Software Defined Radio (SDR) and reconfigurable RF and/or baseband processing to automatically configure their radios after the temporary secondary RF carrier(s) are allocated or de-allocated. SDR can be a radio transmitter and/or receiver employing a technology that allows the RF and baseband attributes including, but not limited to, RF center frequency, RF bandwidth, modulation type, or output power to be set or altered by software, and may not include changes to operating parameters which occur during the normal pre-installed and predetermined operation of a radio according to a system specification or a standard.

SME 302 can assign available secondary carriers to eNB+ for use by its constituent UE. SME 302 can perform the following operations: (1) detection of permissible unused spectrum via access to a regional or national white space database or via cognitive radio techniques to search for available or under-utilized spectrum; (2) dynamic assignment of available spectrum to eNB+ that request reservation of the new bands in order to balance load among eNB+, increase data rates and throughput from the standpoint of the eNB+, and/or increase the number of active users or UEs; and (3) maintain and update a local database to keep track of assigned and released frequency bands. White space spectrum can be unutilized spectrum whereas grey space spectrum can be partially or temporarily utilized spectrum. White and grey spaces can be in the same or different time or carrier frequencies. The available spectrum can be licensed or unlicensed spectrum. In some cases, SME 302 can distinguish between licensed and unlicensed RF bands and shall provision and assign them to radio access systems taking this attribute into consideration. For example, the licensed spectrum may be allocated to macro-eNBs and unlicensed spectrum may be allocated to femto-eNBs (home eNBs) for local or indoor coverage enhancement. A macro-eNB can cover a larger area than that of a femto-eNB.

An eNB+ negotiates quality of service (QoS) parameters with a UE on network entry. The eNB+ ensures that under varying circumstances, the QoS parameters for the UE can be maintained. One factor of QoS can be minimum data rate. The minimum data rate can be achieved by addition of secondary carriers for use by the UE. The eNB+ can request secondary carriers from SME to meet data rates of its UE. SME 302 may utilize Cognitive Radio System (CRS) techniques to perform spectrum management, i.e., capturing the best available spectrum to meet user communication needs as well as channel or mobility conditions. CRS techniques can be used if a database of available spectrum is not used. CRS techniques can be used to sense available spectrum or under utilized spectrum. SME 302 may utilize CRS techniques to decide on the available spectrum band to meet the QoS needs of the eNB+ or the UE. Using CRS techniques, SME 302 can obtain knowledge of operational and geographical environment and parameters as well as established policies and its internal state in order to dynamically and autonomously adjust its operational parameters and protocols according to the obtained knowledge. As an example, the center frequency, bandwidth, duplexing scheme (TDD/FDD), spectral mask and out-of-band emission parameters associated with the frequency band of interest may be obtained.

The SME can support spectrum mobility to attempt to ensure optimal connectivity for mobile terminals. Spectrum mobility can be a process whereby a cognitive-radio-enabled system (i.e., radio access network) changes its frequency of operation as the user terminal moves from one geographical area to another or from the coverage area of one cell to another. Various embodiments permit radio terminals to operate in the best available frequency band, maintaining seamless communication requirements during the transition to other (potentially better) spectrum. For example, QoS or priority of the UE can be maintained despite geographic movement.

In addition, SME 302 may utilize CRS techniques to examine the usage of the temporarily assigned spectral bands and request for release of the spectral bands that are not efficiently or effectively utilized. CRS can use channel sensing techniques to monitor the activity within the spectral bands and detect spectral bands that are not efficiently or effectively utilized. A decision to release secondary RF carrier can be based on spectrum occupancy and utilization, i.e., the amount of fully utilized radio resources, allocated to users, within that frequency band. If a ratio of resource utilization per total number of resources on a carrier is below a threshold for a certain period of time, then the carrier is regarded as an under-utilized carrier. The resources allocated within the under-utilized carrier can be moved to the primary carrier or other secondary carriers provided that load-balancing is acceptable and the under-utilized carrier is released. An SME can decide whether to release any previously assigned secondary carrier. Release procedures for secondary carrier(s) may be triggered by a release request message from the SME to the eNB+.

An eNB+ can decide how to allocate and de-allocate secondary-carriers used by its UE using techniques described in 3GPP LTE. Similarly, a base station can decide how to allocate and de-allocate secondary-carriers to mobile stations using techniques described in IEEE 802.16.

Figure 4:
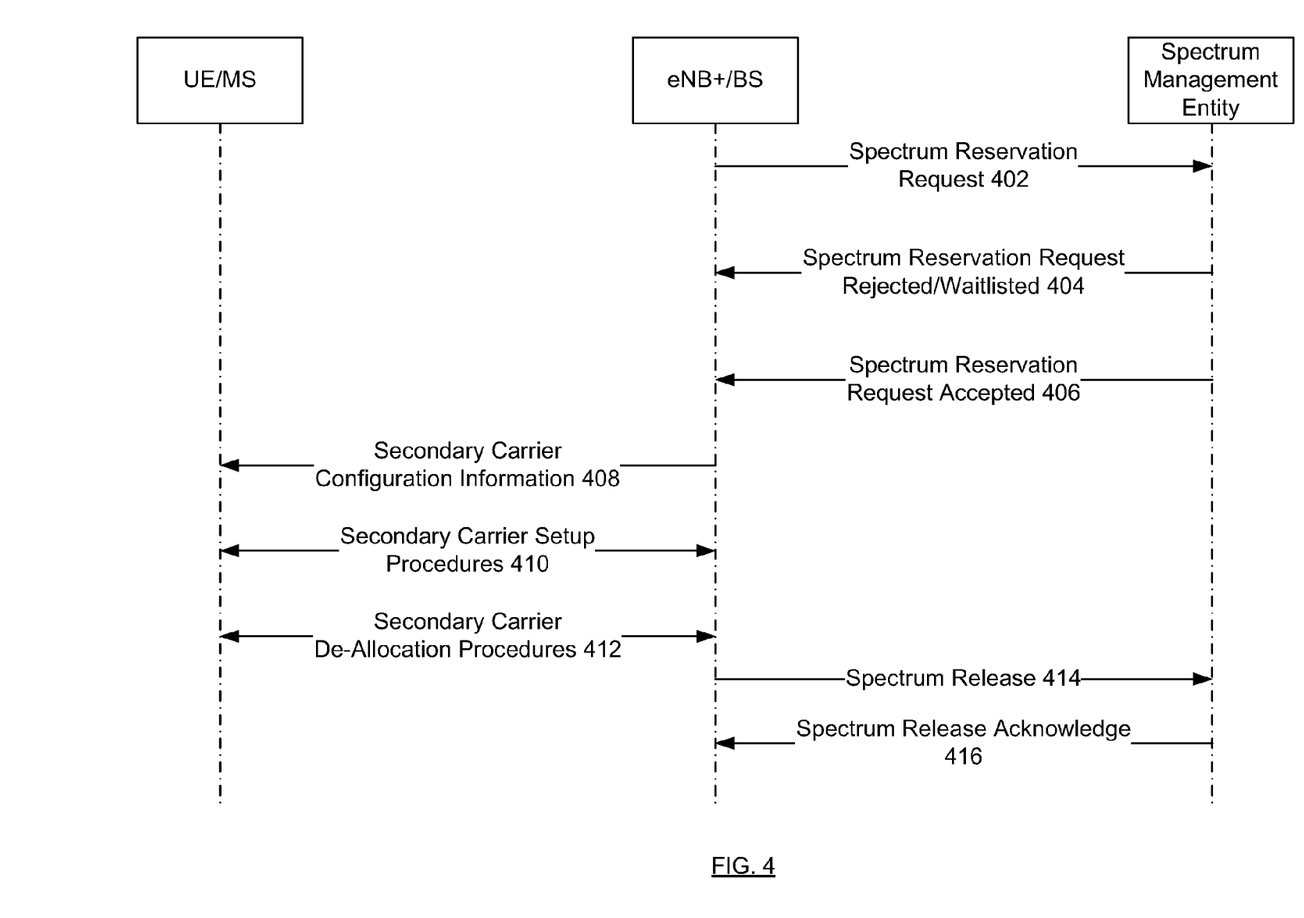
FIG. 4 depicts an example procedure for dynamically requesting, assigning, and releasing RF carriers to multi-carrier enabled base stations or networks.

FIG. 4 depicts an example procedure for dynamically requesting, assigning, and releasing RF carriers to multi-carrier enabled base stations or networks. When an eNB needs additional spectrum, the eNB can send a spectrum reservation request message 402 for reservation of a new RF carrier to the SME. A spectrum reservation request message may contain the number of RF carriers, preferred duplex scheme (TDD/FDD), as well as center frequency, bandwidth, frequency separation of the downlink and uplink in the FDD systems, and other RF requirements for the specific frequency band. In some cases, single spectral bands or two spectral bands not sufficiently apart in frequency may not support FDD operation.

The SME decides whether to accept, reject, or wait list the reservation request. The SME can decide to reject the request if no additional spectral bands are available. The SME can decide to wait list the request if additional bands may become available soon or the priority of the eNB+ is high enough that the SME will attempt to honor the request. If the spectrum requested and intended for use by other eNB+ or not assignable to the eNB+, the spectrum reservation request shall be either rejected or waitlisted and a signal 404 shall be sent to notify the requesting eNB+ of this decision. In one scenario, eNB+ can be assigned secondary carriers on a first come first served basis. Requests can be queued. After a certain length queue of requests or number of secondary carriers are requested, a request from an eNB+ will receive a rejection. In another scenario, some eNB+ can be given higher priority than others based on higher load, expected usage, and/or QoS supported. A request from a higher priority eNB+ may be accepted before prior received requests from lower priority eNB+.

If the request is rejected, the eNB+ can send another reservation request, if the eNB+ still needs additional spectrum (or secondary RF carriers). If the earlier request is waitlisted, the requesting eNB+ can wait until the spectrum becomes available. If the eNB+ is waiting and spectrum becomes available for the eNB+, the SME can notify the requesting eNB+ of available spectrum using the reservation acknowledgement message described with regard to message 406.

If the SME can assign one or more RF carriers to the requesting eNB+, the SME sends an acknowledgement message 406 to the requesting eNB+, the message containing the parameters of the assigned RF carrier(s) including but not limited to spectrum type (TDD/FDD), frequency separation of the downlink and uplink bands in the case of FDD, link direction of each band (downlink or uplink), the required guard-bands, Out-of-Band (OOB) emissions limits, and permissible Adjacent Channel Rejection Ratio (ACLR).

After the eNB+ receives the reservation request acknowledgement, eNB+ sends messages 408 to notify the multi-carrier enabled UEs of the availability of the new secondary RF carriers. Messages 408 can be unicast or broadcast. Assignment of the new RF carrier by the SME can be temporary and the RF carrier RF can be released by eNB+ after it is no-longer in use. SME can decide to request to release the assigned spectrum.

Following unicast or broadcast advertisement of the new RF carrier, the eNB+ can initiate secondary RF carrier setup procedures 410 with the selected multi-carrier capable UEs and make control and traffic allocations on the new secondary carrier(s) in the same way that permanent primary and secondary RF carriers are used. For example, IEEE 802.16 and 3GPP LTE describe suitable procedures for control and traffic allocations on the new secondary carrier(s). The dynamic reservation and release of the additional RF carriers by eNB+ can be transparent to the UEs. In other words, the UEs merely receive a request to configure a secondary carrier or a request to release a secondary carrier.

When the secondary RF carrier is no-longer used or efficiently loaded, the eNB+ may release the secondary RF carrier(s) by first performing the de-allocation of the secondary RF carrier(s) procedures 412 with all UEs configured to use those secondary RF carriers and then sending a spectrum release message 414 to the SME managing the identity of the RF carriers being released. An eNB+ or SME can initiate release of any previously assigned secondary carrier.

The SME can send an acknowledge message 416 to eNB+ confirming the release of the RF carrier(s) and their identities. The released RF carriers shall no longer be used by the eNB+ which has released them, unless they are re-assigned later using RF carrier assignment procedures.

The above techniques provide dynamic spectrum sharing capabilities. The techniques can be applied to various radio access technologies other than 3GPP LTE and the location and implementation of the SME may vary depending on the radio access technology to which the scheme is applied. In various embodiments, SME 302 can be utilized in an eNB or UE.

Various embodiments provide dynamic sharing of the spectrum by the SME among a number of base stations supporting different radio access technologies such as 3GPP LTE and IEEE 802.16. For example, an SME can allocate and release spectrum for different radio access technologies such as 3GPP and IEEE 802.16. The coexistence issues can be considered when assigning different bands to different radio access technologies.

Figure 5:
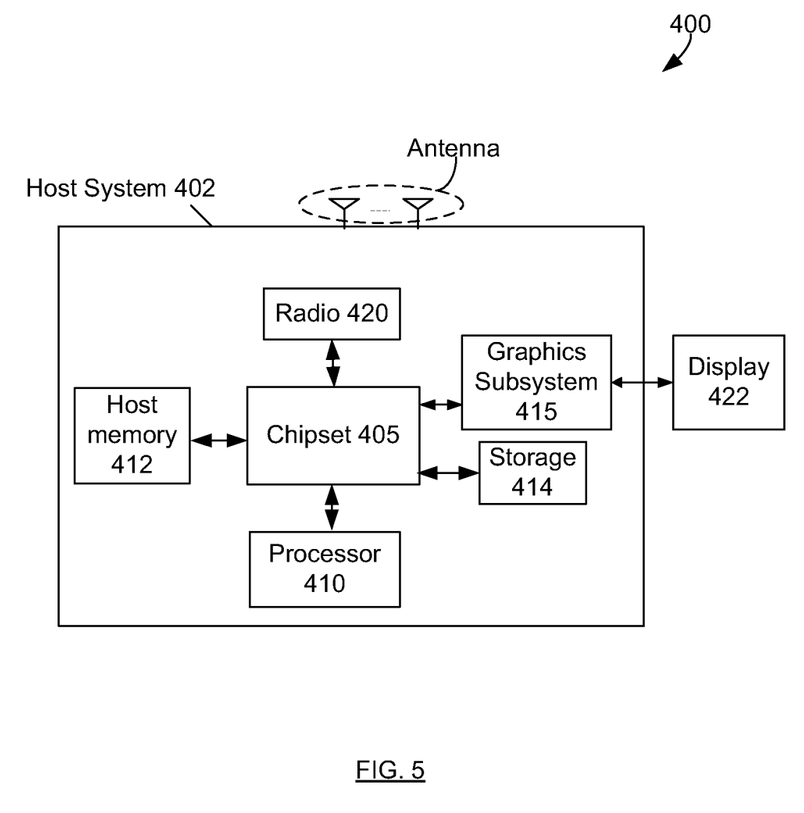
FIG. 5 depicts an example system that can use embodiments of the present invention.

FIG. 5 depicts an example system that can use embodiments of the present invention. Computer system 400 may include host system 402 and display 422. Computer system 400 can be implemented in a handheld personal computer, mobile telephone, set top box, or any computing device. Host system 402 may include chipset 405, processor 410, host memory 412, storage 414, graphics subsystem 415, and radio 420. Chipset 405 may provide intercommunication among processor 410, host memory 412, storage 414, graphics subsystem 415, and radio 420. For example, chipset 405 may include a storage adapter (not depicted) capable of providing intercommunication with storage 414.

Processor 410 may be implemented as Complex Instruction Set Computer (CISC) or Reduced Instruction Set Computer (RISC) processors, x86 instruction set compatible processors, multi-core, or any other microprocessor or central processing unit. In various embodiments, processor 410 or radio 420 configures and releases secondary carriers based on techniques described herein. Secondary carriers can be allocated to an eNB+ or BS and then assigned for use by radio 420. Radio 420 can employ SDR techniques defined herein.

Host memory 412 may be implemented as a volatile memory device such as but not limited to a Random Access Memory (RAM), Dynamic Random Access Memory (DRAM), or Static RAM (SRAM). Storage 414 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 415 may perform processing of images such as still or video for display. An analog or digital interface may be used to communicatively couple graphics subsystem 415 and display 422. For example, the interface may be any of a High-Definition Multimedia Interface, DisplayPort, wireless HDMI, and/or wireless HD compliant techniques. Graphics subsystem 415 could be integrated into processor 410 or chipset 405. Graphics subsystem 415 could be a stand-alone card communicatively coupled to chipset 405.

Radio 420 may include one or more radios capable of transmitting and receiving signals in accordance with applicable wireless standards such as but not limited to any version of IEEE 802.11 and IEEE 802.16. For example, radio 420 may include at least a physical layer interface and media access controller.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method, performed at a base station, the method comprising:
   transmitting a reservation request for spectrum allocation to a spectrum management entity;
   receiving an indication of whether the request is granted, wait listed, or rejected;
   wherein when a wait listed indication is received:
      waiting until the spectrum allocation becomes available; and
      receiving an available spectrum notifications of an available spectrum allocation;
   wherein when a granted indication is received:
      transmitting a secondary carrier configuration information to a user element;
      requesting secondary carrier set-up procedures;
      requesting secondary carrier de-allocation procedures by a mobile station; and
      requesting to transmit an indication of release of a secondary carrier to the spectrum management entity.

2. The method of claim 1, wherein transmitting a request for spectrum allocation takes place in response to an increase in current data rates and throughput at one or more mobile stations serviced by the base station in order to maintain continuity of service or connectivity with certain agreed quality of service level with the one or more mobile stations.

3. The method of claim 1, wherein transmitting a request for spectrum allocation takes place in response to an increase in number of active mobile stations serviced by the base station.

4. The method of claim 1, wherein the indication that the request is granted comprises assignment of one or more secondary carriers.

5. The method of claim 1, wherein the requesting secondary carrier de-allocation procedures is in response to under-utilization of the secondary carrier by its assigned mobile station.

6. The method of claim 1, wherein the requesting secondary carrier de-allocation procedures is in response to mobility of a mobile station from a coverage area of one cell to another cell.

7. A method performed by a spectrum management entity, the method comprising:
   receiving a request for spectrum allocation;
   determining available spectrum;
   determining whether to wait list the spectrum allocation request;
   transmitting a wait list indication when the spectrum allocation request is wait listed;
   granting the spectrum allocation request;
   transmitting a spectrum reservation acceptance when the spectrum allocation request is granted;
   determining to request to release assigned spectrum in response to a ratio of resource utilization per total number of resources on a carrier being below a threshold for a period of time; and
   issuing a request to release assigned spectrum to a base station.

8. The method of claim 7, wherein the determining available spectrum comprises:
   detecting the unused spectrum by access to a database of available spectrum.

9. The method of claim 7, wherein the determining available spectrum comprises:
   using cognitive radio techniques to search for available spectrum or under-utilized spectrum.

10. The method of claim 7, wherein the determining whether to waitlist the spectrum reservation request is based on one or more of: load balancing among base stations, increased data rates and throughput from one or more base stations, and increase the number of active users.

11. The method of claim 7, further comprising:
    updating a database to keep track of assigned and available frequency bands.

12. The method of claim 7, wherein an Evolved Packet Core includes the spectrum management entity.

13. The method of claim 7, wherein an enhanced node B includes the spectrum management entity.

14. A mobile station comprising:
    a display device;
    one or more antennas;
    a radio; and
    a processor configured to:
       receive configuration information of one or more secondary carriers;
       perform a secondary carrier configuration set up procedure with a base station for the one or more secondary carriers;
       configure an RF center frequency, an RF bandwidth, a modulation type, and an output power of the radio for transmission or reception based on the secondary carrier configuration;
       determine to request to release assigned spectrum in response to a ratio of resource utilization per total number of resources on a carrier being below a threshold for a period of time; and
       issue a request to release assigned spectrum to the base station.

15. The mobile station of claim 14, wherein the processor is also configured to:
    perform a carrier release procedure in response to a carrier release request.

16. The mobile station of claim 14, wherein the one or more secondary carriers are allocated to the mobile station based on quality of service (QoS) requirements for the mobile station.

* * * * *